United States Patent Office 3,634,514
Patented Jan. 11, 1972

3,634,514
PRODUCTION OF MALONODIALDEHYDE DIOXIME
Herbert Armbrust, Gruenstadt, Germany, assignor to Badische Anilin- & Soda-Fabrik Aktiengesellschaft, Ludwigshafen (Rhine), Germany
No Drawing. Filed Jan. 14, 1969, Ser. No. 791,154
Claims priority, application Germany, Jan. 23, 1968,
P 16 43 747.1
Int. Cl. C07c *131/00*
U.S. Cl. 260—566 A
9 Claims

ABSTRACT OF THE DISCLOSURE

Production of malonodialdehyde dioxime by reaction of β-aminoacroleins with hydroxylamine. The products are valuable starting materials for the production of dyes and herbicides.

---

The invention relates to the production of malonodialdehyde dioxime by the reaction of β-aminoacroleins with hydroxylamine.

It is known from U.S. patent specification No. 2,560,227 that malonodialdehyde dioxime can be prepared by reaction of malonodialdehyde tetraacetal with hydroxylamine. The process uses the difficulty accessible acetal as starting material and gives the dioxime in unsatisfactory yields. U.S. patent specification No. 3,006,948 describes the reaction of proparglyaldehyde with hydroxylamine to form propargylaldehyde monoxime.

The object of this invention is to provide a new process for the production of malonodialdehyde dioxime in better yields and purity and in a simpler way.

This and other objects of the invention are achieved by reacting with hydroxylamine a β-aminocrolein having the general formula:

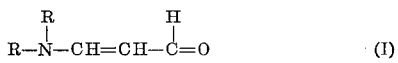

where the radicals R may be identical or different and each denotes an aliphatic, cycloaliphatic, araliphatic or aromatic radiacl or forms a heterocyclic ring with the adjacent nitrogen atom.

When β-dimethylaminoacrolein is used, the reaction may be represented by the following equation:

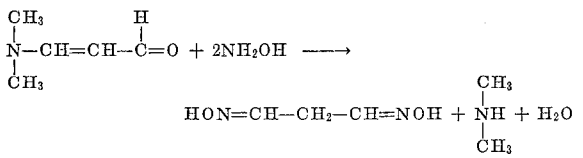

The process according to the invention gives malonodialdehyde dioxime in a better yield and purity and in a simple way than prior art methods. Having regard to U.S. patent specification No. 3,006,948 it is surprising that an unsaturated monoaldehyde should be converted into a dioxime.

Among β-aminoacroleins having the general Formula I, preferred starting materials are those in whose formula the radicals R are identical or different and each denotes an alkyl, cycloalkyl, aralkyl or aryl radical having up to ten carbon atoms, or together with the adjacent nitrogen atom form a five-membered or six-membered heterocyclic ring which may contain one or two nitrogen atoms and, if desired, an oxygen atom. For example the following β-aminoacroleins may be used as starting materials: β-dimethylaminoacrolein, β-diethylaminoacrolein, β-dicyclohexylaminoacrolein, β-dibenzylaminoacrolein, β-diphenylaminoacrolein, β-methylanilinoacrolein, β-morpholinoacrolein, β-piperidinoacrolein, β-dipiperazinoacrolein, β-pyrrylacrolein and β-imidazolylacrolein.

The other starting material is hydroxylamine, preferably in the form of a salt. Examples of suitable salts are the chloride, sulfate, formate or acetate of hydroxylamine. The reaction is generally carried out with from 2 to 6 moles, preferably from 2 to 3 moles, of hydroxylamine per mole of starting material (I).

The two starting materials are reacted as a rule at a temperature of from −10° C. to +105° C., preferably at from +10° to 80° C., at atmospheric or superatmospheric pressure, continuously or batchwise. The reaction is generally carried out in the presence of an inert solvent such as water or an alkanecarboxylic acid, for example glacial acetic acid or propionic acid. It is advantageous to carry out the reaction at a pH value of from 2 to 8, particularly from 4 to 6, basic compounds being added to adjust the pH value in the reaction mixture if necessary. Particularly suitable additives are alkali metal compounds and alkaline earth metal compounds, for example the corresponding hydroxides, carbonates, acetates, propionates and oxides; magnesium, calcium and particularly sodium or potassium are preferred as cations. The amount of basic compound to be added depends on the amount of acid used as solvent or liberated in the reaction of the hydroxylamine salt.

The reaction may be carried out as follows: a mixture of starting material (I) and a hydroxylamine salt, with or without a solvent and a basic compound, is kept for one hour to three hours at the reaction temperature with efficient mixing. The end production is then separated in a conventional way, for example by cooling and filtration of the reaction mixture. If the amine liberated by the reaction is not soluble in the solvent used, for example water, it may be brought into solution by adding acid or removed by steam distillation prior to the separation of the end product.

Compounds which can be prepared according to the process of the invention are valuable starting materials for the production of dyes and herbicides. Reference is made to the above-mentioned patent specifications regarding the use of the compounds.

The invention is illustrated by the following examples. The parts given in the examples are parts by weight.

EXAMPLE 1

14.0 parts of hydroxylamine hydrochloride and 27.2 parts of sodium acetate (3 H₂O) are dissolved in 60 parts of water and then 12.7 parts of β-diethylaminoacrolein is added. A precipitate begins to separate after a few minutes. The mixture is stirred for sixty minutes at room temperature, cooled to 5° C. and suction filtered and the filter cake is washed with a little cold water and dried in vacuo. 9.3 parts of malonodialdehyde dioxime is obtained having a melting point of 142° to 143° C. This is 91.2% of the theory.

EXAMPLE 2

16.8 parts of sodium hydrogen carbonate is added in several portions to a solution of 14.0 parts of hydroxylamine hydrochloride in 70 parts of water. After the evolution of carbon has ended, 12.7 parts of β-diethylaminoacrolein is added, the mixture is stirred for several hours at room temperature and suction filtered and the filter cake is dried in vacuo. 8.6 parts (84.3% of the theory) of malonodialdehyde dioxime is obtained having a melting point of 140° to 141° C.

EXAMPLE 3

16.1 parts of β-methylanilinoacrolein is added to a solution of 14.0 parts of hydroxylamine hydrochloride and 27.2 parts of sodium acetate (3 H₂O) in 60 parts of water and the mixture is stirred for an hour at room temperature. Methylaniline and malonodialdehyde dioxime separate. 20 parts of glacial acetic acid is added to bring the methylaniline into solution and the mixture is stirred for another thirty minutes, cooled to 5° C. and suction filtered.

The filter cake is dried. 6.5 parts (63.8% of the theory) of malonodialdehyde dioxime is obtained having a melting point of 137° C.

EXAMPLE 4

27.2 parts of sodium acetate (3 H$_2$O) and 12.7 parts of β-diethylaminoacrolein are added to a mixture of 14.0 parts of hydroxylamine sulfate and 40 parts of glacial acetic acid. The mixture is stirred for another hour at room temperature, cooled to 5° C. and suction filtered and the filter cake is dried.

A mixture of 8.6 parts of sodium chloride and 8.4 parts (82.4% of the theory) of malonodialdehyde dioxime having a melting point of 144° to 145° C. is obtained.

The end product is isolated from the mixture by digestion with water.

I claim:

1. A process for the production of malonodialdehyde dioxime which comprises reacting with hydroxylamine at a temperature of from —10° C. to +105° C. and at a pH value of from 2 to 8 a β-aminoacrolein having the general formula:

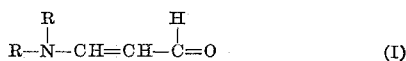
(I)

wherein each radical R alone represents alkyl, cycloalkyl, aralkyl or aryl of up to ten carbon atoms or both radicals R together with the attached nitrogen atom represents a heterocyclic ring of 5 to 6 atoms in the ring including, other than carbon atoms, from one to two nitrogen atoms and not more than one oxygen atom.

2. A process as claimed in claim 1 wherein the reaction is carried out with the chloride, sulfate, formate or acetate of hydroxylamine.

3. A process as claimed in claim 1 wherein the reaction is carried out with from 2 to 6 moles of hydroxylamine for each mole of starting material (I).

4. A process as claimed in claim 1 wherein the reaction is carried out with from 2 to 3 moles of hydroxylamine for each mole of starting material (I).

5. A process as claimed in claim 1 wherein the reaction is carried out at a temperature of from 10° to 80° C.

6. A process as claimed in claim wherein the reaction is carried out in the presence of an inert solvent.

7. A process as claimed in claim 1 wherein the reaction is carried out at a pH value of from 4 to 6.

8. A process as claimed in claim 1 wherein the β-aminoacrolein is β-diethylaminoacrolein.

9. A process as claimed in claim 1 wherein the β-aminoacrolein is β-methylanilinoacrolein.

References Cited

UNITED STATES PATENTS 2,417,024   3/1947   Tuerck et al. _____ 260—464

OTHER REFERENCES

Wagner and Zook, Synthetic Organic Chemistry, p. 741 (1965).

DANIEL D. HORWITZ, Primary Examiner

G. A. SCHWARTZ, Assistant Examiner